L. J. MONAHAN.
GOVERNOR FOR EXPLOSIVE ENGINES.
APPLICATION FILED MAR. 25, 1911.
1,021,879.
Patented Apr. 2, 1912.
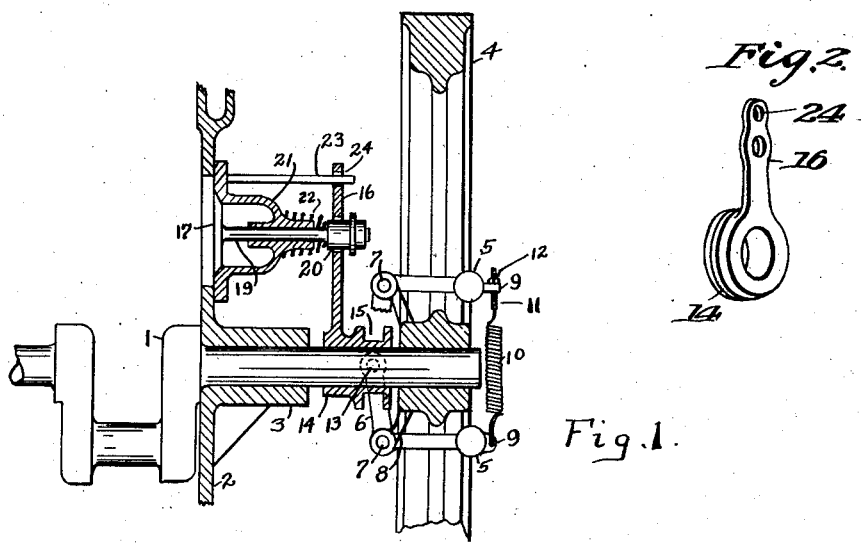

UNITED STATES PATENT OFFICE.

LOUIS J. MONAHAN, OF OSHKOSH, WISCONSIN, ASSIGNOR TO TERMAAT & MONAHAN CO., OF OSHKOSH, WISCONSIN.

GOVERNOR FOR EXPLOSIVE-ENGINES.

1,021,879. Specification of Letters Patent. Patented Apr. 2, 1912.

Application filed March 25, 1911. Serial No. 616,940.

*To all whom it may concern:*

Be it known that I, LOUIS J. MONAHAN, a citizen of the United States, residing at Oshkosh, in the county of Winnebago and State of Wisconsin, have invented certain new and useful Improvements in Governors for Explosive-Engines, of which the following is a specification.

The invention relates to a new and improved governor for explosive engines of the two cycle type, the object of the invention being to provide a governor of simple construction and with novel features.

A further object being to provide a governor arranged to control the engine speed with a minimum of variation and to accomplish same without perceptible noise.

In the drawing Figure 1 shows the governor and connections complete. Fig. 2 shows the sliding collar which slides on the shaft.

The numeral 1 shows a crank shaft of an explosive engine, 2 the engine frame with crank shaft bearing, 3. A fly wheel, 4, is mounted on the crank shaft as shown and carries a fly ball governor composed of weights, 5, forming part of bell crank levers, 6, which are pivoted at 7 to a bracket 8 which is either mounted on the shaft, fly wheel hub or forms part thereof. The balls 5 have lugs 9 extending therefrom. An adjustable spring 10 is arranged to connect the lugs 9 for the purpose of exerting centripetal force on the balls 5, the tension of the spring being variable by means of the stud 11 and nut 12. A specially formed collar (14) with extending portion (16) and a groove (15) is mounted on the crank shaft and adapted to slide thereon. The governor weights and levers are in one casting forming bell cranks, the inner ends arranged to extend down to the groove (15) and have pins (13) secured in ends thereof, adapted to fit into the groove (15), one of the governor arms extending on one side and the other on the opposite side.

An inlet valve 17 with a stem 19 and shoulder nut 20 is mounted in a valve case or chamber 21 and is held closed to its seat by a spring 22. The extending arm 16 is carried around the valve stop nut 20, the nut striking the arm 16, which forms the limit of its travel so that by sliding the collar 14 to the right, the arm 16 is carried therewith and decreases the permissible amount of opening of the valve 17 and when moved far enough to the right, the valve is held closed entirely. A guide pin 23 is secured to the valve chamber and extends outward and through a hole 24 in the upper end of the arm 16 for the purpose of forming a guide for the travel of the collar and arm to cause it to travel longitudinally without rubbing or interfering with the action of the valve nut 20. The valve chamber (21) may extend horizontally to receive a carbureter or other suitable gas or oil feeding device.

In operation the explosive mixture is drawn from a suitable feeding device, through the valve chamber (21), valve (17) and into the base, the quantity of the mixture entering the base depending on the amount of the lift of the valve (17), which is under direct control of the governor. The governor is designed especially for driving electric lights where extreme steadiness is required, so with a slight increase in speed of the engine, the weights 5 fly out by centrifugal force and acting through the bell crank arms 6 draw the collar 14 with its arm 16 toward the fly wheel. By so doing the arm 16 is drawn back toward or against the valve nut 20, causing the valve to take shorter or no lift, which in turn allows the engine to take only a small charge or none, until the speed has slackened back to the normal, when the weights 5 will draw in, slide the collar 14 back and allow the valve 17 to open full or to a varying degree, sufficient to keep the engine at a uniform speed at all times. It will be seen that this type of governor in addition to being effective, is extremely noiseless. The speed of the engine can be varied by varying the tension of the spring 10 so that any desired speed can be had.

Having fully described the invention, what I claim and desire to secure by Letters Patent is:—

1. In a governor for explosive engines, the combination with a crank shaft and fly wheel, of centrifugal governor balls or weights having bell crank extending arms pivotally attached to the fly wheel, a sliding collar mounted on the crank shaft and adapted to be moved horizontally on the shaft by means of the said bell crank arms, an upwardly extending arm forming part of the collar, a suction inlet puppet valve arranged horizontally with its stem above the sliding collar and adapted to pass through the said extending arm, a nut attached to the end of the valve stem and adapted to strike the extending arm when the valve is acted upon by the suction of the engine and means, independent of the valve stem for guiding said arm in a path parallel to the axis of the crank shaft.

2. In a governor for explosive engines the combination with an inlet puppet valve having a stem extending through a guide, a nut on the end of the valve stem, a seating spring between the guide and nut, a crank shaft journaled parallel to the axis of the said puppet valve, a collar 14 adapted to slide on the crank shaft and having an extending part 16 with a hole near the end, the valve stem extending through said hole and the said nut being adapted to strike against the said extending part 16 whereby the permissible opening of the valve is determined by the position of the collar and extending part 16, centrifugal weight mechanism adapted to control the longitudinal position of the collar along the crank shaft.

In testimony whereof I affix my signature in presence of two witnesses.

LOUIS J. MONAHAN.

Witnesses:
A. M. SCHRAM,
W. W. WATERHOUSE.

Copies of this patent may be obtained for five cents each, by addressing the "Commissioner of Patents, Washington, D. C."